(12) United States Patent
Hayman

(10) Patent No.: US 8,994,377 B2
(45) Date of Patent: Mar. 31, 2015

(54) TOOL FOR IMAGING A DOWNHOLE ENVIRONMENT

(75) Inventor: Andrew Hayman, Voisins-le-Bretonneux (FR)

(73) Assignee: Schlumberger Technology Corporation, Sugar Land, TX (US)

(*) Notice: Subject to any disclaimer, the term of this patent is extended or adjusted under 35 U.S.C. 154(b) by 358 days.

(21) Appl. No.: 13/124,868

(22) PCT Filed: Oct. 22, 2009

(86) PCT No.: PCT/EP2009/007639
§ 371 (c)(1),
(2), (4) Date: Apr. 19, 2011

(87) PCT Pub. No.: WO2010/049107
PCT Pub. Date: May 6, 2010

(65) Prior Publication Data
US 2011/0199090 A1    Aug. 18, 2011

(30) Foreign Application Priority Data
Oct. 31, 2008  (EP) ..................... 08168136

(51) Int. Cl.
*G01V 3/00*  (2006.01)
*G01V 3/24*  (2006.01)
*E21B 47/08*  (2012.01)

(52) U.S. Cl.
CPC ............. *G01V 3/24* (2013.01); *E21B 47/082* (2013.01)
USPC ............................ 324/356; 324/355; 324/347

(58) Field of Classification Search
CPC .............. G01V 3/18; G01V 3/20; G01V 3/24
USPC ......... 324/332–343, 346, 348–356, 366–375; 175/50
See application file for complete search history.

(56) References Cited

U.S. PATENT DOCUMENTS

| | | | |
|---|---|---|---|
| 2,749,503 A | 6/1956 | Doll | |
| 3,115,602 A | 12/1963 | Sutton et al. | |
| 4,468,623 A | 8/1984 | Gianzero et al. | |
| 4,567,759 A | 2/1986 | Ekstrom et al. | |
| 4,614,250 A | 9/1986 | Panetta et al. | |
| 5,426,368 A | 6/1995 | Benimeli | |
| 5,574,371 A | 11/1996 | Tabanou | |
| 6,191,588 B1 | 2/2001 | Chen | |
| 6,218,842 B1 * | 4/2001 | Bittar et al. | 324/339 |
| 6,417,667 B1 * | 7/2002 | Bratton | 324/338 |
| 6,479,990 B2 * | 11/2002 | Mednikov et al. | 324/225 |
| 6,600,321 B2 * | 7/2003 | Evans | 324/369 |
| 6,714,014 B2 | 3/2004 | Evans et al. | |

(Continued)

FOREIGN PATENT DOCUMENTS

GB    2414081    11/2005

*Primary Examiner* — Huy Q Phan
*Assistant Examiner* — Adam Clarke
(74) *Attorney, Agent, or Firm* — Stephanie Chi; Jody DeStefanis

(57) ABSTRACT

The invention is concerned with a tool and method for determining standoff from a formation though mud. The tool comprising a first electrode located at a distance from the formation for measuring a first impedance. A second electrode is located at a second distance from the formation for measuring a second impedance. A processing unit measures a difference between the first impedance and the second impedance, uses the difference to determine a conductivity of the mud and based thereon, determines the standoff of at least one of the first and the second electrode.

17 Claims, 6 Drawing Sheets

(56) References Cited

U.S. PATENT DOCUMENTS

| | | | |
|---|---|---|---|
| 6,809,521 B2 | 10/2004 | Tabarovsky | |
| 7,066,282 B2 | 6/2006 | Chen et al. | |
| 7,394,258 B2 | 7/2008 | Itskovich et al. | |
| 7,397,250 B2 | 7/2008 | Bespalov et al. | |
| 7,928,733 B2 * | 4/2011 | Gorek et al. | 324/364 |
| 8,362,780 B2 * | 1/2013 | Rosthal et al. | 324/338 |
| 2002/0117299 A1 | 8/2002 | Haugland et al. | |
| 2003/0155925 A1 * | 8/2003 | Tabarovsky et al. | 324/374 |
| 2003/0210061 A1 | 11/2003 | Fabris et al. | |
| 2004/0021066 A1 * | 2/2004 | Schneider et al. | 250/266 |
| 2007/0046290 A1 * | 3/2007 | Bespalov et al. | 324/367 |
| 2007/0103162 A1 * | 5/2007 | Morys et al. | 324/367 |
| 2008/0272789 A1 * | 11/2008 | San Martin et al. | 324/355 |
| 2008/0288171 A1 * | 11/2008 | Itskovich et al. | 702/7 |
| 2009/0114472 A1 * | 5/2009 | Winkler et al. | 181/105 |
| 2009/0302854 A1 * | 12/2009 | Forgang et al. | 324/355 |
| 2010/0019772 A1 * | 1/2010 | Gorek | 324/355 |
| 2010/0148787 A1 * | 6/2010 | Morys et al. | 324/366 |
| 2010/0154531 A1 * | 6/2010 | Han et al. | 73/152.47 |
| 2011/0241689 A1 | 10/2011 | Hayman | |

* cited by examiner

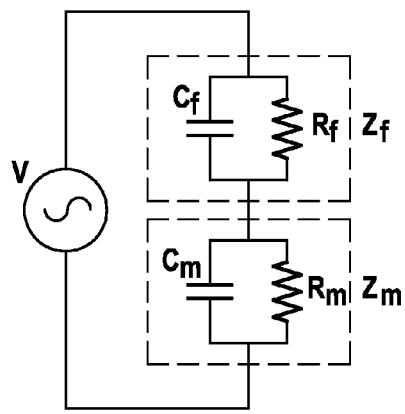
FIG. 4
FIG. 5
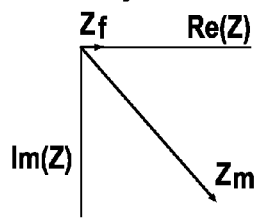
(a)
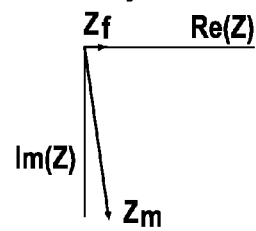
(b)
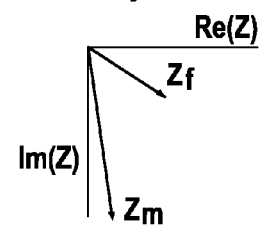
(c)
FIG. 6
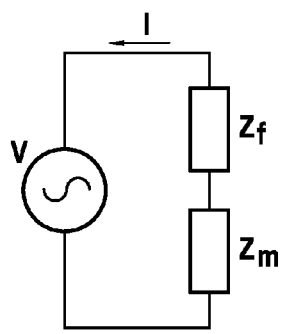
(a)
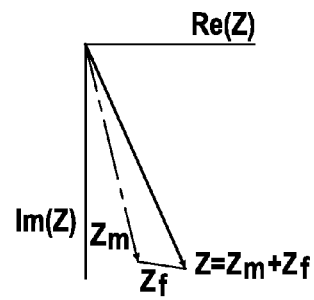
(b)
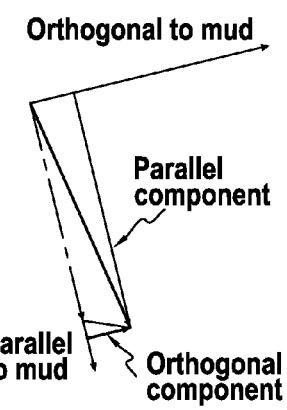
(c)

$\Delta Z_m = Z(b\_mud) - Z$

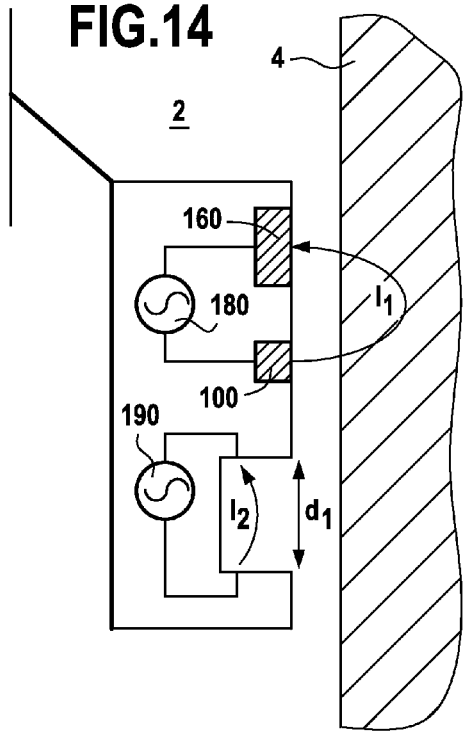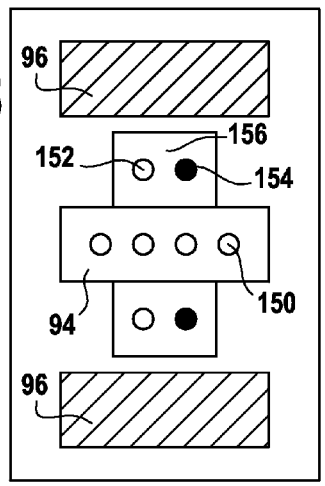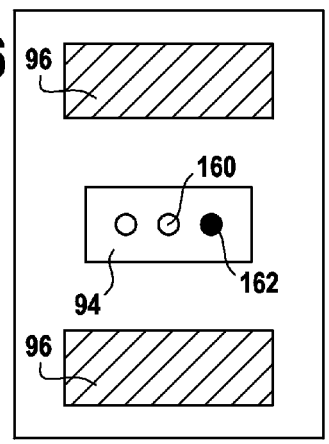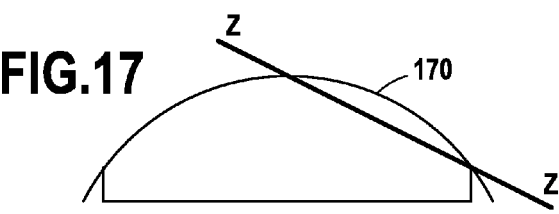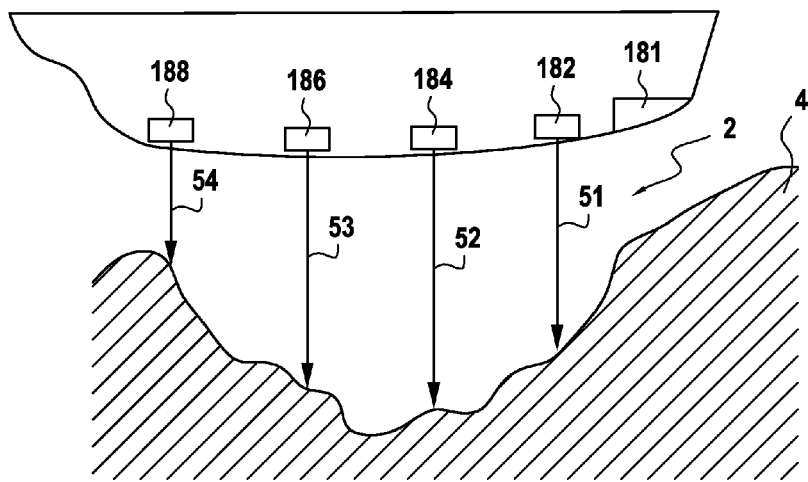

TOOL FOR IMAGING A DOWNHOLE ENVIRONMENT

FIELD OF THE INVENTION

The invention relates to a tool for imaging a formation, and in particular but not exclusively, a tool for imaging a formation through a substantially non-conductive medium.

BACKGROUND OF THE INVENTION

For oilfield and hydrocarbon exploration it is particularly useful to have a tool that is capable of scanning a subsurface geological formation and to convey data representing the various strata and hydrocarbons that constitute a subsurface geological formation. Specifically, after drilling a borehole down into the earths crust, it would be useful to have downhole tools that are capable of being run along the borehole wall and scanning the surrounding formation to provide an image of the formation's properties to a user on the surface. Equally, it is useful to have such a tool mounting on or close to a drill tip so that the formation can be imaged as the drill penetrates into the earths crust. This would enable a user to measure and/or image various formation parameters close to or ahead of the drill bit and from there get the latest information about the downhole formation, which might impact on the direction being drilled.

Tools using current injection are known, for example U.S. Pat. No. 4,468,623, U.S. Pat. No. 4,614,250, U.S. Pat. No. 4,567,759, U.S. Pat. No. 6,600,321, U.S. Pat. No. 6,714,014 or U.S. Pat. No. 6,809,521; that use current injection measurements in order to obtain micro-electric images of a borehole wall, the borehole penetrating geological formations.

Such tools inject AC current into the formation from one or more small electrodes (called "buttons") and measure the current from each button and the voltage between the imaging buttons and the return electrode. In conductive mud (for example, water-based) the imaging button is surrounded by a guard electrode to force the current into the formation. In non-conductive (oil-based) mud such a guard is not necessary if the formation is more conductive than the mud at the frequency of operation. The imaging buttons plus guard electrode (if present) compose the injector. The impedance (voltage/current) seen by each button is indicative of the resistivity of a small volume of formation in front of each button. The area of the return electrode is usually much larger than the size of the injector, in order that the current tube spreads out between the injector and return to ensure first a high sensitivity and good resolution in front of the imaging buttons and second low sensitivity and resolution in front of the return electrode.

Such tools can be adapted for wireline use, in which an array of imaging buttons is at equipotential with a guard electrode on a pad (laterolog principle) and the return is on a distant part of the tool mandrel. Such tools operate at frequencies in the range 1-100 kHz where the formation generally has a resistive character and dielectric effects can be neglected except at very high resistivities.

Such tools can be adapted as logging-while drilling tools, which are able to achieve full coverage of the borehole with a limited number of electrodes by drill-string rotation. Laterolog principles are used, sometimes with additional focusing by hardware or software.

However, the use of such tools in non-conductive oil-based mud is of limited use because the impedance measured is generally dominated by the mud impedance between the injection electrode and formation that is in series with the formation impedance. Reasonable images can be obtained in high-resistivity formations, i.e. above about 1000 Ω·m, but poor images result in formations having a lower resistivity.

Broadly speaking, two approaches have been adopted to enable better imaging through oil-based mud in formations of low resistivity.

The first approach relies on a different measurement principle, the four-terminal method as described in U.S. Pat. No. 6,191,588. Here the current is generated in the formation using two large electrodes near the ends of a pad and potential differences in the formation are measured using pairs of small electrodes at the centre of the pad. Using this technique the resolution is worse than conventional current injection tools because it is determined by the separation of the pair of voltage electrodes (rather than the size of the current injection electrode). Also, this technique is insensitive to events (bedding, fractures etc) parallel to the current flow (usually parallel to the borehole axis).

The second approach is to increase the frequency of injection-type tools in order to reduce the mud impedance, i.e. U.S. Pat. No. 2,749,503.

At high frequencies, various processing techniques have been suggested to reduce the influence of the non-conductive mud between the pad and the borehole. U.S. Pat. No. 7,066,282 proposes measuring the real part of the impedance seen by the button, while U.S. Pat. No. 6,809,521, U.S. Pat. No. 7,394,258 and U.S. Pat. No. 7,397,250 all require making at least one mathematical approximation based on the mud impedance being essentially imaginary, or the formation impedance being essentially real, or using more than one frequency and assuming various mud properties are independent of frequency. These approximations have limited ranges of validity, since they do not adequately account for the electrical properties of the rocks and muds.

It is therefore desirable to provide a tool that is able to reduce the influence of the non-conductive mud medium when using a current injection principle and to avoid the previously-mentioned limitations.

SUMMARY OF THE INVENTION

According to a first aspect of the present invention there is provided a tool for determining standoff from a formation though mud, the tool comprising: a first electrode located at a distance from the formation for measuring a first impedance; a second electrode located at a second distance from the formation for measuring a second impedance; a processing unit for measuring a difference between the first impedance and the second impedance, using the difference to determine a conductivity of the mud and based thereon, determining the standoff of at least one of the first and the second electrode.

Preferably, wherein the conductivity is a complex conductivity containing phase and amplitude information. Wherein the at least one of the first and the second electrode is an imaging button.

Preferably, wherein the standoff dm is a distance by which at least one of the first and the second imaging buttons is recessed from the formation and is determined from:

$$d_m = A_m \cdot |Z_m \cdot \sigma^*|$$

where Am is the effective area of the button, σ* is the complex conductivity and Zm is the impedance of the mud.

According to a further aspect of the present invention there is provided a method for determining standoff from a formation though mud, the method comprising: measuring a first impedance by a first electrode located at a distance from the formation; measuring a second impedance by a second electrode located at a second distance from the formation; determining a difference between the first impedance and the second impedance; determining a conductivity of the mud using the difference; and determining the standoff of at least one of the first and the second electrode.

According to a further aspect of the present invention there is provided a tool for determining the impedance of mud in a borehole, the tool comprising: a notch recessed in a body of the tool; a generator for applying a voltage difference between a first location of the notch and a second location of the notch; the notch having dimensions that ensure current flows from the first location to the second location directly through the mud; and a processing unit for measuring the impedance of the mud based on the voltage difference and the current.

Preferably, wherein the tool is adapted for imaging a formation in a borehole filled with mud, and wherein the impedance of the mud is used to determining the standoff.

BRIEF DESCRIPTION OF THE DRAWINGS

The present invention is illustrated by way of example and not limited to the accompanying figures, in which like references indicate similar elements:

FIG. 4 shows a further reduced equivalent circuit of impedances as seen by an imaging electrode;

FIGS. 5a, 5b and 5c show typical impedance vector diagrams in oil-based mud in different conditions of frequency and formation resistivity;

FIG. 6a shows the reduced circuit of the impedances;

FIG. 6b shows the vector diagram of the impedances;

FIG. 6c shows a determination of the orthogonal and parallel components according to one embodiment;

FIG. 14 shows an alternative embodiment for determining the mud impedance;

FIG. 15 shows another embodiment of button placement on a pad;

FIG. 16 shows yet another embodiment of button placement on a pad;

FIG. 17 shows a cut-off section for implementing the recessed button place of the embodiment in FIG. 16; and FIG. 18 shows another embodiment with a plurality of electrodes for obtaining a profile of the borehole wall.

DETAILED DESCRIPTION OF THE INVENTION

Figure 1:
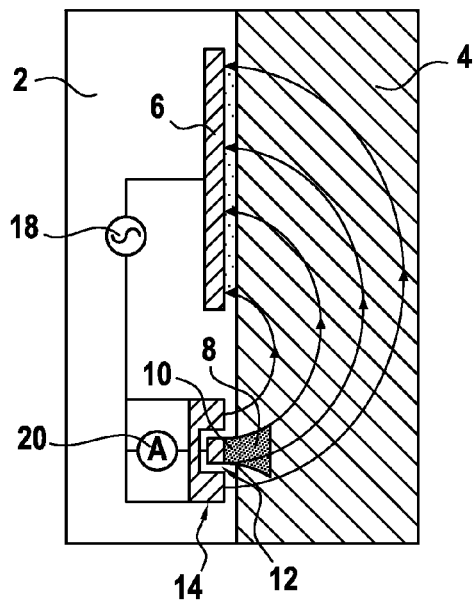
FIG. 1 shows a partial cross-section view of a part of a typical high-frequency current injection tool.

FIG. 1 shows a partial cross-section of the current injection principle. Specifically, there is shown a tool located in mud 2 down a borehole surrounded by a rock formation 4. There is a button, or injection electrode, 10 which is responsible for injecting current into the formation 4 and returns to the tool via a return electrode 6. The imaging button 10 has a sensitive imaging region 8 and is insulated 12 from a guard electrode 14.

Specifically, there is a shown a voltage source 18 that generates a potential difference between the imaging button 10 and the return electrode 6. Since these electrodes are a different potential, a current is injected into the formation which follows along the paths indicated. FIG. 1 also shows an ammeter 20 for measuring the current injected into the formation. In practice, this might take the form of a small known resister, where the current can be determined from the known voltage across the resistor divided by the known resistance itself.

Moreover, it is possible to determine the complex impedance Z by dividing the known generated complex voltage by the known complex current. By complex is meant that the relevant parameter, i.e. voltage V, current I or impedance Z, have an in-phase (or real) component as well as a quadrature (imaginary) component if represented on Cartesian axes. Alternatively, if a polar co-ordinate system is used, complex means the relevant parameters can also be represented in terms of an amplitude and phase component.

Figure 2A:
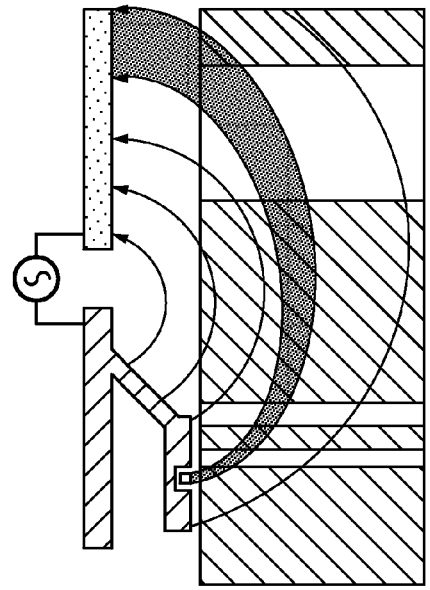
FIGS. 2a and 2b respectively show examples of imaging tools designed for water-based mud and oil-based mud respectively.
Figure 2B:
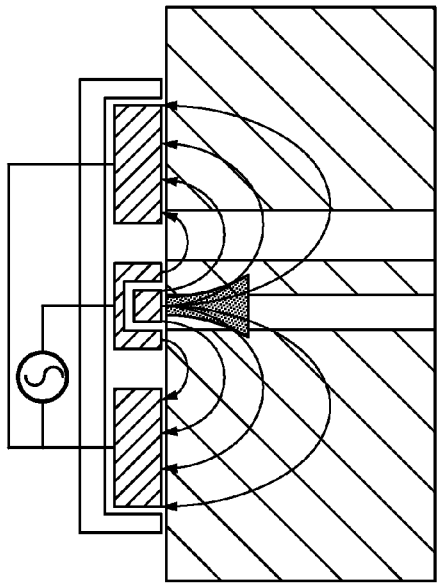

FIGS. 2a and 2b show a high frequency imaging tool that are designed for water-based mud and oil-based mud respectively.

Figure 3:
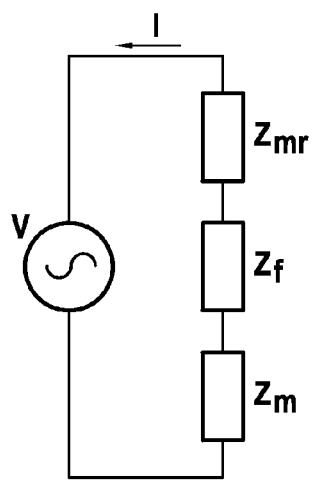
FIG. 3 shows an equivalent circuit of impedances as seen by an imaging electrode.

FIG. 3 shows an approximate electrical equivalent circuit of the impedances seen by an imaging button in non-conductive oil-based mud. Specifically, the impedance measured is of the mud impedance Zm, the formation impedance Zf and the mud return impedance Zmr, in series.

Current injection tools are usually designed so the area of the return electrode is much greater than the area of the injection electrode so that the measurement is not sensitive to the formation adjacent to the return. This being so, the mud impedance between the return and formation Zmr can usually be neglected compared to the mud impedance between the injection electrode and the formation Zm. In other words: Zm>>Zmr.

FIG. 4 shows the revised impedance model neglecting the mud return impedance Zmr as well as splitting the impedances into their respective capacitive and resistive components. Specifically, the formation impedance Zf is represented by the formation capacitance Cf in parallel with the formation resistance Rf. The mud impedance Zm is represented by the mud capacitance Cm in parallel with the mud resistance Rm.

The total impedance Z is given by $$Z = Z_m + Z_f$$

where $$Z_m = (d_m/A_m)/\sigma^*_m$$

$$Z_f = (d_f/A_f)/\sigma^*_f$$

The complex conductivity (also called admittivity) σ* is given by:

$$\sigma^* = \sigma + i\omega \in$$

and d is the effective distance along the current path, A is the effective area of the current path and ∈ is the permittivity.

$Z_m$ and $Z_f$ can be thought of as parallel R-C circuits as shown in FIG. 4 with:

$$R_m = d_m/(A_m \cdot \sigma_m)$$

$$C_m = \in_m A_m/d_m$$

$$R_f = d_f/(A_f \cdot \sigma_f)$$

$$C_f = \in_f A_f/d_f$$

Concerning the mud, $d_m$ is the thickness of the mud medium between the imaging electrode and the formation while $A_m$ is the area of the electrode. If the mud medium is 2 mm thick and the electrode has a radius of 2.5 mm, $A_m/d_m \sim 10^{-2}$ m. Concerning the formation, the factor $A_f/d_f$ is typically 10 to 100 times smaller than $A_m/d_m$ because the penetration depth in the formation $d_f$ is much greater than the thickness of the mud medium $d_m$ The phase angles of the impedances are given by:

$$\phi_m = -\tan^{-1}(\omega \in_m/\sigma_m)$$

$$\text{and } \phi_f = -\tan^{-1}(\omega \in_f/\sigma_f)$$

for the mud and formation respectively. Typical values of $\omega \in /\sigma$ for rock and mud are taken from laboratory measurements.

FIG. 5 shows typical impedance vectors when the formation resistivity is sufficiently low that the mud impedance is greater than the formation impedance. The only assumption that can be made is that the phases of the mud and formation impedances are different.

Specifically, FIG. 5(*a*) shows a conventional FMI operating at around 10 kHz in oil-based mud with a formation resistivity of about 100 Ω·m. The mud impedance is much greater than the formation impedance, the mud impedance phase is in the range −90 to −30 deg and the formation phase is very close to zero (pure resistance).

FIG. 5(*b*) shows a high-frequency FMI operating at around 50 MHz in oil-based mud with a formation resistivity of about 1 Ω·m. The mud impedance is much greater than the formation impedance, the mud impedance phase is in the range −80 to −90 deg and the formation phase is close to zero (pure resistance).

FIG. 5(*c*) shows a high-frequency FMI operating around 50 MHz in oil-based mud with a formation resistivity of about 10 Ω·m. The mud impedance is greater than the formation impedance, the mud impedance phase is in the range −80 to −90 deg and the formation impedance phase is about −30 deg.

So for all these situations the only assumption that can be made is that the phases of the mud and formation impedances are different. However, an embodiment of the present invention seeks to discriminate against the mud and to become only sensitive to the formation, thus allowing better imaging in formations having low resistivity.

In order to make such a discrimination, it is necessary to determine the component of the total impedance that is perpendicular to the phase of the mud impedance.

FIG. 6 shows a series of figures showing how such a discrimination is made. Specifically, FIG. 6(*a*) shows the total impedance being the sum of the formation impedance Zf and the mud impedance Zm in series. FIG. 6*b* shows a vector diagram where the impedance vectors are plotting on a set of real and imaginary axes. These axes show the magnitude and phase of each of the formation Zf and mud Zm impedance vectors and how these sum to give the total impedance vector Z.

Finally, FIG. 6*c* shows in accordance with an embodiment of the invention that the total impedance Z is broken into components that are parallel and orthogonal to the mud. The parallel component is sensitive mainly to the mud and can be used as a qualitative indicator of button standoff for quality control. The orthogonal component is completely insensitive to the mud and sensitive only to the formation.

Thus, knowing the mud phase (i.e. phase angle of the mud impedance vector) $\phi_m$, the orthogonal and parallel components can be calculated using standard rotation equations. The real and imaginary axes are rotated by $90+\phi_m$ degrees to become the orthogonal and parallel axes, respectively.

According to an embodiment of the invention the mud phase is determined by measuring the total impedance at two distances from the borehole wall, wherein the difference of the impedances represents the impedance of the extra mud medium. In one embodiment this is achieved by adding an extra "mud" button, which is recessed to sit a few mm further from the borehole wall than the other imaging button(s).

Figure 9:
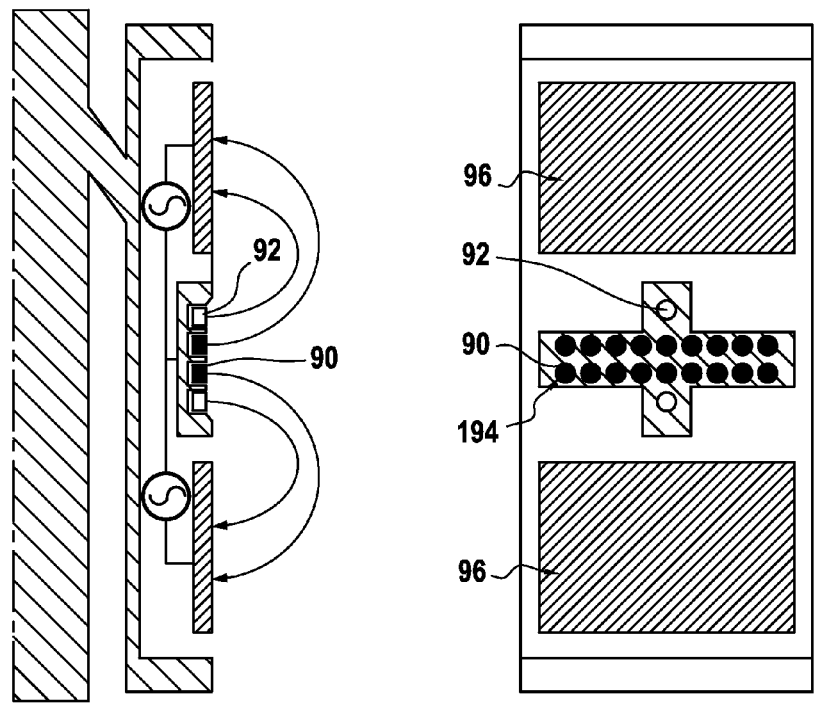
FIG. 9 shows a high frequency imaging pad with recessed mud buttons according to an embodiment.

An example of such a recessed mud button configuration according to an embodiment of the invention is shown in FIG. 9. Specifically, the cross-section view shows that the mud button 92 is recessed at a slightly further distance away from the borehole wall than the array of imaging buttons 90 is spaced from the borehole wall. The array of imaging buttons 90 in this embodiment is insulated from a surrounding guard electrode residing on a pad of the imaging tool, which is aligned adjacent to a face of the borehole.

Figure 12:
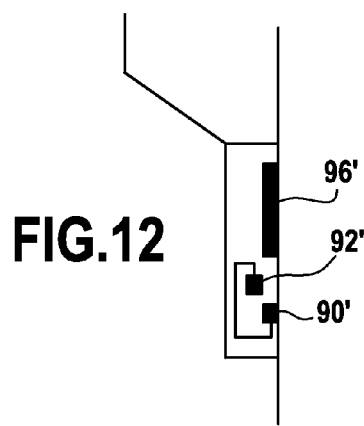
FIG. 12 shows an imaging pad with only a single recessed button according to a further embodiment.

The particular embodiment of FIG. 9 shows a double return-pad 96 configuration, but it should be appreciated that a more basic embodiment as shown in FIG. 12 is equally possible. Indeed, FIG. 12 shows a basic embodiment comprising a single return pad 96', a single recessed mud button 92' and a single imaging button 90'.

Figure 7:
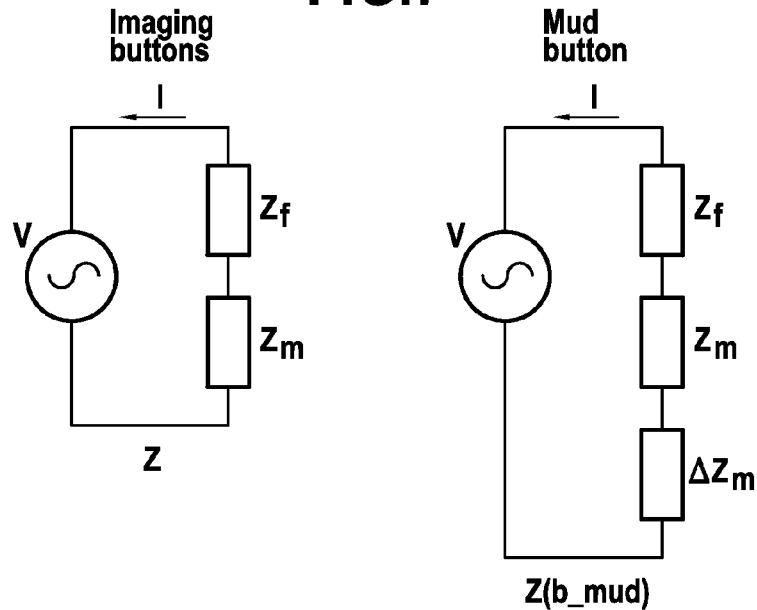
FIGS. 7a and 7b show equivalent circuits for measurement of mud impedance using recessed buttons according to an embodiment.

FIGS. 7(*a*) and 7(*b*) shows the equivalents circuits as seen from the imaging and mud buttons respectively.

Specifically, the imaging button sees:

$$Z = Z_m + Z_f,$$

whereas, the mud button sees $$Z(b\_mud) = Z_m + Z_f + \Delta Z_m$$

and the difference is the extra mud impedance:

$$\Delta Z_m = Z(b\_mud) - Z$$

Figure 8:
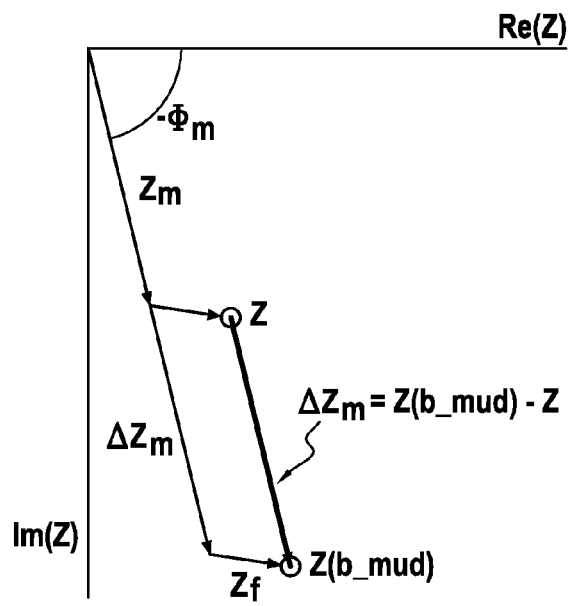
FIG. 8 shows the mud impedance measurement in vector form.

FIG. 8 shows this in vector form. The phase of the impedance $\phi_m$ is calculated in the normal manner:

$$\phi_m = \tan^{-1}(\text{Imag}(\Delta Z_m)/\text{Real}(\Delta Z_m))$$

Thus, the embodiment shown in FIG. 9 is a high frequency pad operating in the range 1-100 MHz. The two recessed mud buttons 92 are of each of similar size to the imaging buttons 90 and are surrounded by an equipotential guard electrode like the imaging buttons. A guard need not be used in an alternative embodiment. In this way the mud buttons measure an impedance very close to the impedance that would be measured by the imaging buttons if the pad were further away from the borehole wall. $\Delta Z_m$ can be determined from the difference in impedances measured by one imaging button and one mud button.

$\Delta Z_m$ is proportional to the distance by which the mud button 92 is recessed. However, the phase of the mud impedance is not sensitive to this distance so the technique does not need accurate knowledge of the distance and it can cope with wear on the imaging electrode.

The mud buttons 92 are advantageously placed close to the imaging array and multiplexed into the same current amplification and detection electronics. This automatically corrects any phase errors in the electronics (for example, due to high temperature downhole or inaccurate calibration). A phase shift will rotate all the impedance vectors, including $\Delta Z_m$, by the same angle.

Moreover, the configuration of FIG. 9 or 12 allows errors in the measurement to be reduced by calculating the average or median impedance seen by the mud buttons and the average or median impedance seen by two or more of the imaging buttons.

The formation impedance seen by the imaging button at an instant in time is different from that seen by the mud button, because the measurements are made at slightly different physical positions on the pad. The mud button measurement can be depth-shifted to the same depth as the imaging buttons using well-known techniques. However, depth shifting is not necessary since the mud properties are expected to vary slowly compared to the formation properties. It is preferable (and simpler) to take the average or median of the measurements of both Z and Z(b_mud) over a range of depths of at least a meter in order to average the formation impedance component.

There are alternative embodiments using recessed electrodes, for example instead of using a recessed mud button and an imaging button, the mud impedance may be measured using two mud buttons, one of which is recessed compared to the other.

In another embodiment, instead of using a recessed mud button and an imaging button, the mud impedance may be measured using two imaging buttons, one of which is recessed compared to the other.

In another embodiment, the button(s) used to measure mud impedance may have different size and shape, the difference being corrected by calculation.

In another embodiment, the processing technique of taking the mud measurement may be performed in oil-based mud, whether the tool is originally designed for water-based mud or oil-based mud. Imaging tools capable of operating in the frequency range from about 1 kHz to 100 MHz are capable of being adapted for such mud measurement.

FIG. 15 shows yet another button placement embodiment, in which there are two mud buttons on each side of the imaging button array 150. At least one of the mud buttons is recessed. An advantage of this configuration is that the two mud buttons are each at the same distance from the return electrode so the impedance measurement taken of the formation can be averaged and hence made more accurate.

FIG. 16 shows yet another button placement embodiment, in which the guard electrodes 152 (shown in FIG. 15 is no longer present). Specifically, the configuration of FIG. 16 shows all the electrodes to be located in a co-planar manner and on the same guard electrode 94. This configuration is advantageous in providing space saving on the pad.

FIG. 17 shows a profile of the pad which typically has a curvature shown by 170. However, it is possible to implement the embodiment of FIG. 16 by taking a machine cut along line Z-Z to recess at least one of the electrodes.

It should be appreciated that the embodiments of the invention are capable of being adapted for use in wireline applications, for example by mounting the electrodes on pads or skids. The return electrode can be on the same pad, on a different pad or on a tool mandrel or a combination of these.

Alternatively, the imaging tools adapted to an embodiment of the invention can be used in LWD (Logging While Drilling) applications, for example by mounting electrodes on a drill collar, stabiliser blade, rotating sleeve, pad or a combination of these. The return electrode can be on the same pad, on an adjacent part of the drill collar, sleeve or stabilizer.

The guard electrode is not essential, especially when the formation is more conductive than the mud, i.e. when the modulus of the formation of the formation conductivity is greater than the modulus of the mud conductivity. In such an embodiment, the current lines tend to be nearly perpendicular to the borehole wall.

Thus, in an embodiment of the invention $\Delta Z_m$ is obtained by subtracting the impedance from an electrode recessed from another, which is in turn is used to determine the phase of the complex mud impedance. This in turn is used to establish the orthogonal impedance component, which provides a more accurate image for low resistivities formations.

Alternatively, in another embodiment, the mud impedance Zm can be measured differently in that the current travels directly from an injector to a return via a volume of mud. In this embodiment the injector and return electrode are separate from the main imaging electrode. The injector and return electrodes can be co-planar (located on the same face of a pad) or be located face-to-face in a recess on a pad, stabilizer or tool body. Specifically, FIG. 14 shows a pad with a recess notched out of its profile. The notch is shown to be of width d1. For this embodiment, it is necessary to either have a separate current source 190 or additional wiring/electronics that draw power from the main voltage source 180. By applying the separate voltage source 190 across the notch, a potential difference is setup which causes a current I2 to flow directly across the gap. Thus, this is an alternative method of being able to deduce the impedance of the mud Zm provided mud is flowing in the borehole and into the notch.

Thus, the mud impedance is capable of being measured in different ways. The separate injector embodiment does not require further recessed buttons, but requires slightly more space due to the separation needed. On the other hand the recessed electrode embodiment allows for close placement of the mud button to the imaging button. This allows for the multiplexing of the electronics, which not only saves space but automatically allows for correction of phase shifts in the electronics.

Figure 10:
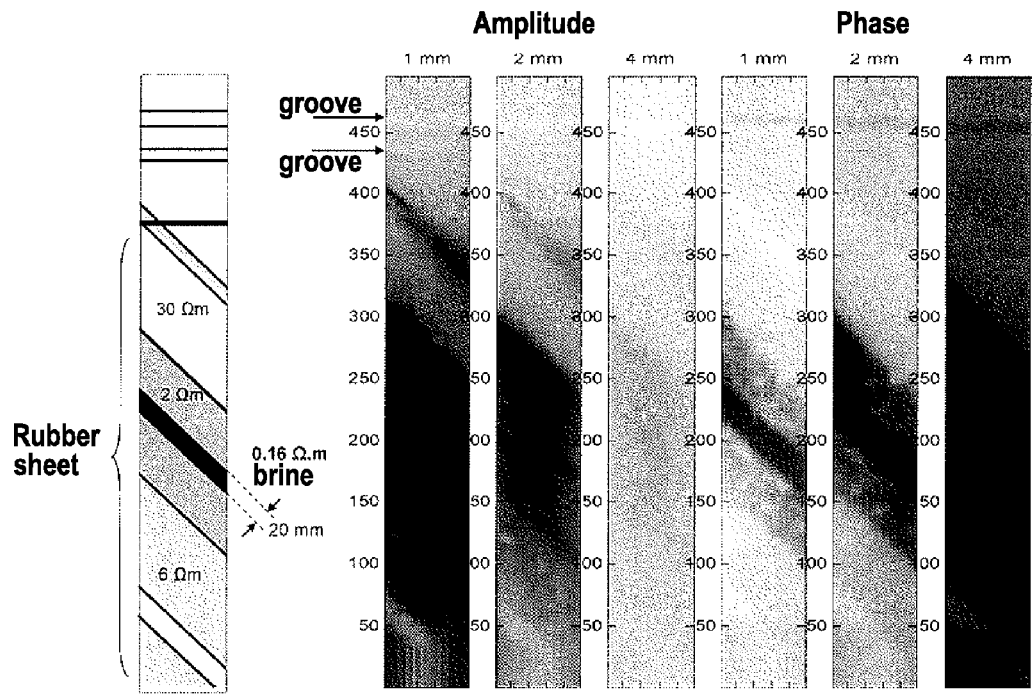
FIG. 10 shows results of amplitudes and phase measurements at three standoffs.
Figure 11:
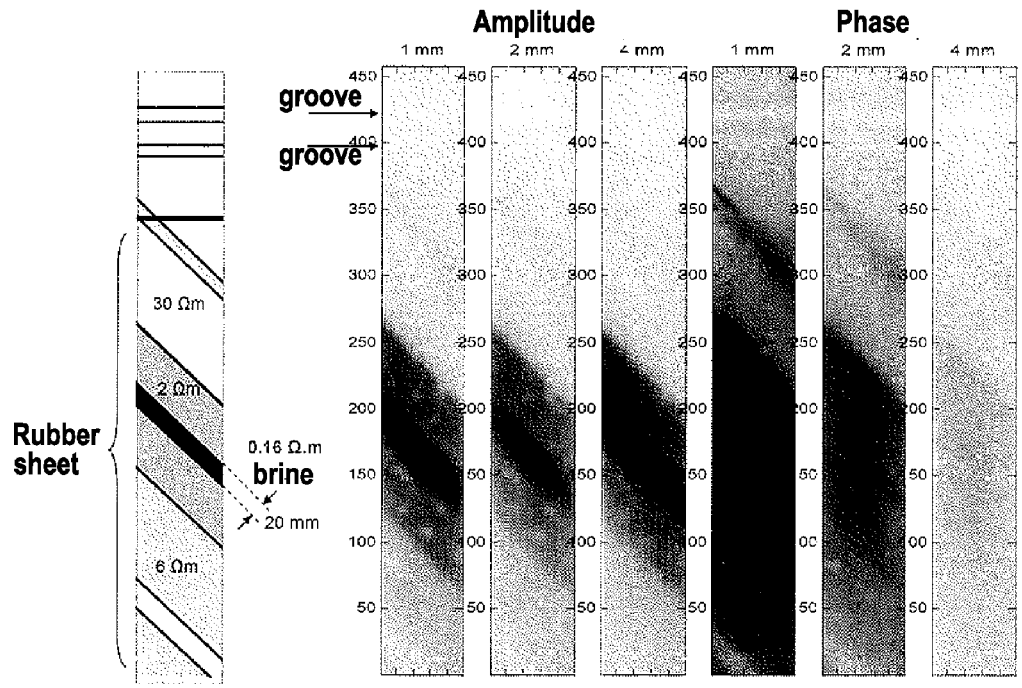
FIG. 11 shows results of orthogonal and parallel components of impedance measured at three standoffs.

FIGS. 10 and 11 show results of the mud impedance measurement and orthogonal processing performed on lab data. The pad used for these measurements was not equipped with extra recessed mud buttons. Instead, the impedance measured by the imaging buttons at a greater standoff was used to simulate the recessed buttons.

Specifically, FIG. 10 shows a block of artificial rock containing beds of resistivities from 0.2 to 30 Ω·m. The block was scanned with an imaging tool at a frequency above 1 MHz in oil-based mud. Images 1 to 3 from the left show the amplitude measurement at three standoffs: 1, 2 and 4 mm, and images 4 to 6 show the phase measurement at three standoffs. Both amplitude and phase are affected by standoff.

FIG. 11 shows the impedance components for the same data set. Images 1 to 3 from the left show the orthogonal component and images 4 to 6 show the parallel component. The images showing orthogonal component of impedance are almost unaffected by standoff and are weakly sensitive to the two parallel mud-filled grooves at the top of the image.

According to another embodiment of the invention, the obtained $\Delta Z_m$ is used to also determine other properties.

For example, in one embodiment the $\Delta Z_m$ measurement is used to calculate the complex conductivity of the mud provided the geometry of the mud button is accurately known.

$$\sigma^* = \Delta d_m / (A_m \cdot \Delta Z_m)$$

where $\Delta d_m$ is the distance by which the mud button is recessed and $A_m$ is the effective area of the button.

From the complex conductivity, it is possible to then determine the real-valued conductivity, permittivity and resistivity of the formation using standard equations:

$$\sigma = \text{Real}(\sigma^*)$$

$$\in = \text{Imag}(\sigma^*)/\omega$$

where $\sigma$ is the conductivity, $\in$ the permittivity.

When the material is highly conductive, the real-valued resistivity is given by $$\rho = 1/\sigma$$

It is possible to use more than one frequency (simultaneously or sequentially) to optimise the measurement sensitivity to the mud or formation. To determine the standoff of the imaging buttons it is preferable to use a relatively low frequency (for example from about 10 kHz to 1 MHz) so that the imaging buttons are much more sensitive to the mud than the formation ($Z_m \gg Z_f$).

From the measured mud complex conductivity, it is also possible to determine the standoff for each imaging button at a low frequency as follows:

$$d_m = A_m \cdot |Z_m \cdot \sigma^*|$$

To image the formation it is preferable to use higher frequencies that are less sensitive to the mud. For the lowest resistivity formations (below 1 Ω·m), a frequency in the range 10-100 MHz is preferable, while for high resistivities above 100 Ω·m a frequency in the range of 100 kHz to 1 MHz suffices. It should be understood that these frequency ranges could alter depending on electronic and processing improvements.

In turn, the standoff and complex mud conductivity can be used in other processing algorithms to determine the formation properties.

The standoff can be used for quality control of the measurements. The standoff can also be used to improve the accuracy of hole radius measurements.

In the embodiment of a wireline tool with several pads pressed against the borehole wall, by taking the sum of the mechanically measured pad radius and the standoff on each imaging button a detailed hole shape image can be produced. FIG. 18 shows an embodiment of this where a plurality of electrodes are 182, 184, 186, 188 are mounted on a pad, all capable of injecting current into the formation which completes its path to the return pad 181. The electrodes 182, 184, 186 and 188 are shown to measure the standoffs S1, S2, S3, and S4 respectively. It is then possible for these respective standoff measurements to be combined to allow a profile or shape of the actual borehole wall to be constructed.

In the embodiment of a rotating LWD tool, the standoff can be used to determine the position of the tool relative to the borehole wall, and if two diametrically opposed buttons are used the hole diameter can be determined at each azimuthal position.

Figure 13:
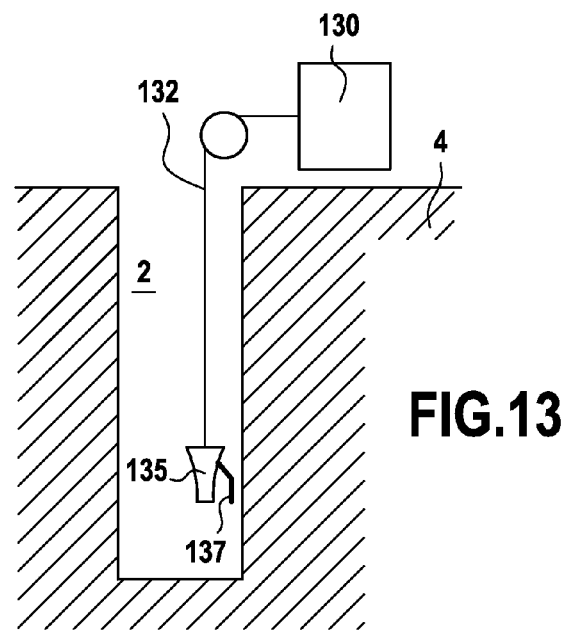
FIG. 13 shows an example of a wireline application.

FIG. 13 shows an overview of a wireline application where an embodiment of the invention may be applied. Specifically, an imaging tool 135, equipped for example with a pad 137, is suspended from a wireline cable 132 downhole. The borehole 2 is surrounded by the earth formation 4. The imaging tool sends imaging information to surface equipment 130.

To summarise some of the embodiments described, one embodiment of the invention is concerned with orthogonal processing, wherein the component of the mud impedance phase that is orthogonal to the total impedance is determined. This improves imaging especially in oil-based mud in low resistivity formations.

Another embodiment of the invention is concerned with determining the mud impedance phase from the difference in impedances measured by two electrodes arranged at different distances from the borehole wall.

Another embodiment is concerned with using the mud impedance obtained from recessed mud electrodes to determine other formation properties such as the mud conductivity or standoff or for improving the accuracy of the borehole radius measurements.

Another embodiment is concerned with determining the mud impedance phase directly from current passing directly across a notch in the pad without entering the formation.

Thus it is possible to obtain accurate images when the formation impedance is less than the mud impedance. This is achieved by discriminating against the mud by measuring the phase of the complex mud impedance and calculating the component of the total complex impedance orthogonal to the mud phase. The phase angle of the mud impedance is preferably measured from the difference between the impedances measured by two electrodes at different distances from the formation. Preferably, one of the difference electrodes is an imaging electrode and the other is an additional "mud" electrode situated close to it and recessed so as to be at a greater distance from the formation. However, other configurations have also been described.

The invention claimed is:

1. A tool for determining standoff from a formation though mud, the tool comprising:
   a first electrode located at a distance from the formation for measuring a first impedance;
   a second electrode located at a second distance from the formation for measuring a second impedance, wherein the at least one of the first and the second electrode is an imaging button; and
   a processing unit for measuring a difference between the first impedance and the second impedance, using the difference to determine a conductivity of the mud and based thereon, and determining a first standoff the first electrode and a second standoff of the second electrode wherein the first standoff dm is a distance by which the imaging button is recessed from the formation and is determined from:

$$d_m = A_m \cdot |Z_m \cdot \sigma^*|$$

where Am is the effective area of the button, $\sigma^*$ is the complex conductivity and Zm is the impedance of the mud.

2. The tool of claim 1, wherein the conductivity is a complex conductivity containing phase and amplitude information.

3. The tool of claim 1, wherein at least one of the first and second electrodes inject current into the formation at a frequency.

4. The tool of claim 3, wherein a relatively low frequency is used such that the at least one of the first and second electrodes is more sensitive to the mud than the formation.

5. The tool of claim 4, wherein the frequency is selected in a range from 10 kHz to 1 MHz.

6. The tool of claim 1, wherein the determined first standoff and second standoff are used for determining a radius of a borehole in which the tool is located.

7. The tool of claim 6, wherein further electrodes are located on the tool that operate together with the first and the second electrode to determine a detailed profile shape of a wall of the borehole.

8. The tool of claim 1, wherein the tool is mounted on a logging while drilling (LWD) tool, wherein rotation of the at least one of the first and second electrode enables a detailed profile shape of the borehole wall to be determined.

9. The tool of claim 8, wherein the first and the second electrode are located as diametrically opposed buttons on the LWD tool.

10. The tool of claim 1, wherein the mud is substantially non-conductive.

11. The tool of claim 1, wherein the first and second electrode each effectively measure a first and a second total complex impedance of the mud and formation.

12. The tool of claim 1, wherein the first standoff or second standoff and the conductivity of the mud are used to determine a formation property.

13. The tool of claim 1, wherein the processing unit is configured to combine the first standoff and the second standoff to profile the formation.

14. A method for determining properties of a formation though mud, the method comprising:
 measuring a first impedance by a first electrode located at a distance from the formation;
 measuring a second impedance by a second electrode located at a second distance from the formation;
 determining a difference between the first impedance and the second impedance;
 determining a conductivity of the mud using the difference; and
 determining a first standoff of the first electrode and a second standoff of the second electrode, wherein the first standoff dm is determined from the relationship below:

$$d_m = A_m \cdot |Z_m \cdot \sigma^*|$$

where dm is the first standoff, Am is the effective area of the button, $\sigma^*$ is the complex conductivity and Zm is the impedance of the mud.

15. The method of claim 14, comprising imaging the formation using the determined standoff.

16. The method of claim 14, comprising determining a radius of a borehole based on the determined standoff.

17. The method of claim 14, comprising profiling the formation by combining the first standoff and the second standoff.

* * * * *